3,332,986
PHOSPHINYLMETHYLPHOSPHINIC ACIDS
Burton Peter Block, Wayne, Ivan C. Popoff, Ambler, James Ping King, Elkins Park, and Ludwig K. Huber, Philadelphia, Pa., assignors to Pennsalt Chemicals Corporation, Philadelphia, Pa., a corporation of Pennsylvania
No Drawing. Filed June 24, 1963, Ser. No. 290,233
5 Claims. (Cl. 260—500)

This invention relates to compounds of phosphorus which have the structure

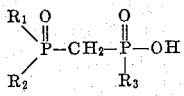

where $R_1$, $R_2$ and $R_3$ are hydrocarbon alkyl and hydrocarbon aryl groups containing from one to ten carbon atoms. The compounds of this invention are useful as chelating agents which agents are known to be of value in analytical procedures, as dyes and pigments, as intermediates, as catalysts and for various other applications.

The compounds of the invention are prepared in two steps by first reacting at elevated temperature (say at about 100° to 175° C.) a chloromethylphosphine oxide of structure $R_1R_2P(O)CH_2Cl$ with a phosphonite diester of structure $R_3P(OR_4)_2$ where $R_1$, $R_2$ and $R_3$ are as defined above and $R_4$ is a lower alkyl group, and then hydrolyzing the esters obtained under acid conditions.

The chloromethylphosphine oxide reactants may be made by the process described by Kabachnik and Shepeleva (C.A. 49:843i 1955). When $R_1$ and $R_2$ of the chloromethylphosphine oxide are different, a preferred method for the preparation is that which involves the reaction of a Grignard reagent with a compound of structure $R_1(ClCH_2)P(O)Cl$; viz:

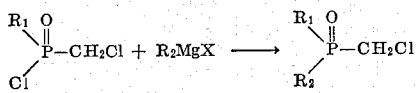

Chloromethylphosphine oxides useful to prepare the compounds of this invention will include diphenylchloromethylphosphine oxide,
methylphenylchloromethylphosphine oxide,
dimethylchloromethylphosphine oxide,
methylethylchloromethylphosphine oxide,
dibutylchloromethylphosphine oxide,
phenylhexylchloromethylphosphine oxide,
methyltolylchloromethylphosphine oxide,
dinaphthylchloromethylphosphine oxide,
phenylnaphthylchloromethylphosphine oxide,
naphthylethylchloromethylphosphine oxide,
phenyloctylchloromethylphosphine oxide,
didecylcloromethylphosphine oxide,
ditolylchloromethylphosphine oxide, and the like.

The ester reactants of structure $R_3P(OR_4)_2$ are well known compounds whose preparation is described by Kosolapoff in his book "Organophosphorus Compounds," J. Wiley & Sons, 1950, p. 139. These ester reactants will include those compounds where $R_3$ is methyl, ethyl, propyl, butyl, hexyl, octyl, decyl, phenyl, tolyl, xylyl, naphthyl and the like and where $R_4$, as already indicated, will be a lower alkyl group such as methyl, ethyl, propyl and butyl.

The invention is further described by reference to the following examples:

*Example 1*

Diphenylchloromethylphosphine oxide is prepared by the method of Kabachnik and Shepeleva referred to above.

A mixture of 10.0 g. (0.04 mole) of

and 7.92 g. (0.04 mole) of $C_6H_5P(OC_2H_5)_2$ is placed in a 250 ml. three-necked flask equipped with a reflux condenser, nitrogen inlet tube, and thermometer well and containing a magnetic stirring bar. The mixture is slowly heated in an oil bath with stirring and under a slow stream of nitrogen. At 80° C. the solution clears and vigorous evolution of $C_2H_5Cl$ is observed above 160° C. accompanied by a rapid increase to 175° C. The reaction temperature is maintained between 170° and 180° C. for a period of two hours. After the reaction product has cooled to room temperature under nitrogen, it is triturated three times with 50-ml. portions of chilled diethyl ether. There results 11.6 g. of white solid melting at 114–118° C. which is purified by distillation at 240° C./0.2 mm. Hg to give a melting point of 122–124° C. Calcd. for $C_{21}H_{22}O_3P$: C, 65.61; H, 5.77; P, 16.12. Found: C, 65.74; H, 5.74; P, 15.96. This solid ester

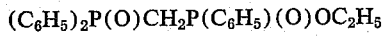

is hydrolyzed by refluxing it in 100 ml. of 2 M HCl for 7.5 hours. The HCl solution is then distilled off, and benzene is distilled from the residue until a clear solution results. After the solution stands overnight, 6.7 g. (47% yield) of a white solid melting at 125–130° C. is isolated. Repeated recrystallization of this solid from toluene (or acetonitrile) yields a white crystalline solid with a melting point of 130–131° C. The infrared spectrum of this product shows P—$C_6H_5$, P→O, and P—OH absorptions and is consistent with the structure

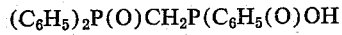

*Analysis.*—Calcd. for $C_{19}H_{18}O_3P_2$: C, 64.05; H, 5.09; P, 17.39; neutral equivalent 356. Found: C, 63.90; H, 5.31; P, 17.45; n.e. 355.

*Example 2*

Phenylmethylchloromethylphosphine oxide is prepared in two steps. Using the method of Kabachnik and Shepeleva, dichlorophenylphosphine is reacted with para-formaldehyde to yield chloro-chloromethylphenylphosphine which is then reacted with methyl magnesium bromide to give phenylmethylchloromethylphosphine oxide.

A mixture of 10.0 g. (0.053 mole) of

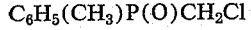

and 10.5 g. (0.053 mole) of $C_6H_5P(OC_2H_5)_2$ is treated in the same way as the mixture in Example 1. A clear solution forms at 104° C. and ethyl chloride is liberated. Similar work up give 8.5 g. (51.6% yield) of crude product melting at 205–210° C. Recrystallization from benzene yields a product with a melting point of 206–208° C. The infrared spectrum is quite similar to that of

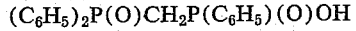

but has a band at 7.7μ which is due to the P—$CH_3$ group. Calcd. for $C_{14}H_{16}O_3P_2$: C, 57.20; H, 5.45; P, 21.10; neutral equivalent, 294. Found: C, 56.86; H, 6.10; P, 21.13; neutral equivalent, 292.

*Example 3*

Dimethylchloromethylphosphine oxide is prepared in a manner analogous to that for phenylmethylchloromethylphosphine oxide given in Example 2.

A mixture of 8 g. (0.063 mole) of $(CH_3)_2P(O)CH_2Cl$ and 12.5 g. (0.063 mole) of $C_6H_5P(OC_2H_5)_2$ is treated in the same manner as the mixture in Example 1. The solution becomes clear at 80° C., and the exothermic evolution of ethyl chloride starts at 150° C. After two hours at 170–180° C., ethyl chloride is no longer liberated. The reaction product is washed several times with n-hexane prior to hydrolysis. Work up as in Example 1 gives 11.5 g. (78% yield) of crude product melting at 112–140° C. Repeated recrystallization from acetonitrile gives a white crystalline solid melting at 143–145° C. Its infrared spectrum is very similar to that of $$(C_6H_5)(CH_3)P(O)CH_2P(C_6H_5)(O)OH$$

Calcd. for $C_9H_{14}O_3P_2$: C, 46.60; H, 6.04; P, 26.70; neutral equivalent, 232. Found: C, 46.70; H, 6.16; P, 26.89; neutral equivalent, 230.

Example 4

Instead of using phenylchloromethylphosphine oxide in Example 1, dinaphthylchloromethylphosphine oxide is used with essentially the same results yielding a product having the structure

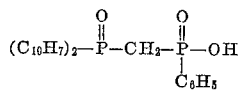

Example 5

If in Example 1 the diester $C_6H_5P(OC_2H_5)_2$ is replaced with $C_8H_{17}P(OC_4H_9)_2$ the reaction proceeds in a similar manner to yield a product of structure

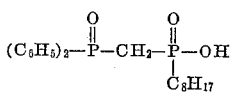

Example 6

In a similar manner, when methyltolylchloromethylphosphine oxide is used in the procedure of Example 1 a product of structure

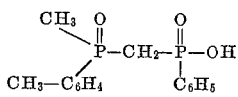

is obtained.

As is evident from the above examples, compounds of the invention are colorless crystalline solids which melt sharply at temperatures on the order of 100° to 200° C. and higher. The compounds are soluble in hydrocarbon solvents such as benzene, toluene and xylene from which they are readily crystallized. Likewise they are soluble in polar materials such as acetonitrile, propionitrile and the like, ketones such as methylethyl ketone, alcohols such as methanol, isopropanol, etc., and the like. As indicated, the compounds are useful chelating agents involving the oxy and hydroxy portions of the molecule. Examples illustrating the chelating capabilities of the compounds follow:

Example 7

A solution of 2.3 g. (0.0063 mole) of $$(C_6H_5)_2P(O)CH_2P(C_6H_5)(O)OH$$

and 0.64 g. (0.0028 mole) of $Zn(OCOCH_3)_2 \cdot 2H_2O$ in 50 ml. of ethanol is refluxed for 3.5 hours. Removal of the solvent leaves a viscous oil which yields a white precipitate upon treatment with 40 ml. of diethyl ether. This product is recrystallized from an ethanol-benzene mixture to give 2.0 g. (92% yield) of a white solid melting at 265–273° C. Initial weight loss, which may be sublimation, occurs at about 300° C. on the thermobalance.

Calcd. for $[(C_6H_5)_2P(O)CH_2P(C_6H_5)O_2]_2Zn$: C, 58.80; H, 4.39; P, 16.0; Zn, 8.2; mol. wt. 775. Found: C, 58.67; H, 4.75; P, 15.32; Zn, 8.4; mol. wt. 1401 (in chloroform). The analysis and molecular weight determination show that the product obtained has the structure

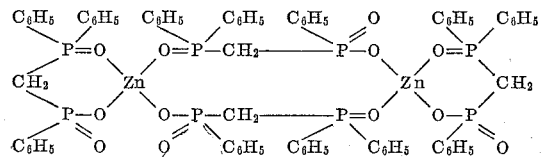

which embodies a significant amount of chelation in the molecule. It is this chelation which contributes to the improved thermal stability of the molecule as is evident from the fact that it decomposes 100° C. higher than zinc acetylacetonate.

Example 8

A mixture of 2.0 g. (0.0068 mole) of $$(C_6H_5)(CH_3)P(O)CH_2P(C_6H_5)(O)OH$$

and 0.74 g. (0.0034 mole) of $Zn(OCOCH_3)_2 \cdot 2H_2O$ in 60 ml. of benzene is refluxed for three hours. The oily residue left after the benzene is distilled off is added to 49 ml. of n-hexane. The resulting precipitate is dissolved in chloroform and reprecipitated with n-hexane. Yield is 2.1 g. (95%) of a white solid melting at 135–160° C. and soluble in most solvents.

Calcd. for $C_{28}H_{30}O_6P_4Zn$: C, 51.55; H, 4.61; P, 19.05; Zn, 10.0; mol. wt. 651. Found: C, 51.61; H, 5.10; P, 18.69; C, 50.81; H, 4.99; P, 20.05; Zn, 10.5; mol. wt. 1302.

Example 9

A mixture of 4.4 g. (0.015 mole) of $$C_6H_5(CH_3)P(O)CH_2P(O)(C_6H_5)OH$$

and 1.58 g. (0.0045 mole) of $Cr(CH_3COCHCOCH_3)_3$ in 100 ml. o-dichlorobenzene is refluxed for 12 hours. The course of the reaction is followed by detecting the acetylacetonate liberated. The reaction product is subjected to distillation to strip off most of the solvent, and the viscous residue is dissolved in 70 ml. of benzene. The benzene solution is filtered, and the filtrate is evaporated to a volume of 30 ml. to which 200 ml. of petroleum ether is added, resulting in instant precipitation of a green solid (4.0 g.). A sample of 1.84 g. of the solid product is dissolved in 10 ml. of chloroform. The chloroform solution is poured into an $Al_2O_3$ column which is eluted with chloroform and absolute ethanol, respectively. Two solids recovered from chloroform and ethanol solutions have softening ranges of 210–234° C. and 210–218° C. respectively. Initial weight losses of these compounds occur at about 330° and 350° C.

Calcd. for $[C_6H_5(CH_3)P(O)CH_2P(O)(C_6H_5)O]_3Cr$: C, 54.02; H, 4.84; P, 19.98; Cr, 5.59. Found: C, 53.88; H, 5.38; P, 17.37; Cr, 5.5. C, 53.55; H, 4.86; P, 17.69; Cr, 5.7.

Example 10

If instead of using $C_6H_5P(OC_2H_5)_2$ in Example 3, $CH_3P(OC_2H_5)_2$ is used, the compound of structure $$(CH_3)_2-P(O)CH_2P(CH_3)(O)OH$$

is obtained in good yield.

It will be understood that numerous changes may be made from the above description and examples without departing from the spirit and scope of the invention.

We claim:

1. Compounds of structure

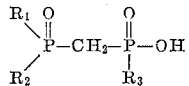

where $R_1$, $R_2$ and $R_3$ are selected from the group consisting of hydrocarbon alkyl and aryl containing from one to ten carbon atoms.

2. A compound as in claim 1 where $R_1$, $R_2$ and $R_3$ are phenyl radicals.

3. A compound as in claim 1 where $R_1$ and $R_3$ are phenyl and $R_2$ is methyl.

4. A compound as in claim 1 where $R_1$ and $R_2$ are methyl and $R_3$ is phenyl.

5. A compound as in claim 1 where $R_1$, $R_2$ and $R_3$ are methyl.

References Cited

UNITED STATES PATENTS

| 2,634,288 | 4/1953 | Boyer et al. | 260—932 |
| 3,161,687 | 12/1964 | Garner | 260—606.5 |
| 3,256,370 | 6/1966 | Fitch et al. | 260—500 |

OTHER REFERENCES

Frank: "Chem. Reviews" (1961), pp. 293, 411.

Kabachnik et al.: "Chem. Abstracts," vol. 49, 1955, p. 843.

Kosolapoff: "Organophosphorus Compounds" (1950), pp. 121, 122, 139.

LEON ZITVER, *Primary Examiner.*

J. E. EVANS, *Assistant Examiner.*